(12) United States Patent
Shearin et al.

(10) Patent No.: US 10,592,713 B1
(45) Date of Patent: Mar. 17, 2020

(54) COMPUTATIONALLY-AUGMENTED VIDEO DISPLAY FACILITATING PACKAGE HANDLING

(71) Applicant: Datalogic USA, Inc., Eugene, OR (US)

(72) Inventors: Alan Shearin, Eugene, OR (US); WenLiang Gao, Eugene, OR (US)

(73) Assignee: Datalogic USA, Inc., Eugene, OR (US)

( * ) Notice: Subject to any disclaimer, the term of this patent is extended or adjusted under 35 U.S.C. 154(b) by 0 days.

(21) Appl. No.: 16/237,408

(22) Filed: Dec. 31, 2018

(51) Int. Cl.
*G06K 7/10* (2006.01)
*G06K 9/00* (2006.01)
*G06K 7/14* (2006.01)

(52) U.S. Cl.
CPC ....... *G06K 7/10861* (2013.01); *G06K 7/1092* (2013.01); *G06K 7/1447* (2013.01); *G06K 9/00671* (2013.01)

(58) Field of Classification Search
CPC ............ G06K 7/10861; G06K 7/1092; G06K 7/1447; G06K 9/00671
USPC ........................................................ 235/385
See application file for complete search history.

(56) References Cited

U.S. PATENT DOCUMENTS

| | | | |
|---|---|---|---|
| 8,810,401 B2 * | 8/2014 | Karttaavi | G01S 13/74 235/375 |
| 8,947,456 B2 | 2/2015 | Chen et al. | |
| 10,438,318 B2 * | 10/2019 | Pohl | G06T 3/0012 |
| 2011/0050872 A1 | 3/2011 | Harbert et al. | |
| 2016/0026032 A1 * | 1/2016 | Moore | G06K 7/10316 382/103 |
| 2017/0165841 A1 | 6/2017 | Kamoi | |
| 2018/0089870 A1 | 3/2018 | Billi-Duran et al. | |
| 2018/0197139 A1 * | 7/2018 | Hill | G06Q 10/0833 |
| 2018/0311704 A1 | 11/2018 | Gil | |
| 2018/0339865 A1 | 11/2018 | Schroader | |

OTHER PUBLICATIONS

Glockner et al., Augmented Reality in Logistics, Changing the way we see logistics—a DHL perspective, DHL Customer Solutions & Innovation, 2014, 28 pgs.

* cited by examiner

*Primary Examiner* — Michael G Lee
*Assistant Examiner* — David Tardif
(74) *Attorney, Agent, or Firm* — Cozen O'Connor

(57) ABSTRACT

An automated package-handling support solution receives video observation of a target area in a package-handling facility that includes packages. A display device is configured to produce video images visible from the target area. An operator support system processes the motion-video observation to detect the packages in the target area and retrieve a package-specific routing-related attribute and a package-specific property for each of the packages. The system generates the video output to include a first portion representing the video observation of the packages, and a second portion that includes a package-specific dynamic informational overlay corresponding to each of the packages.

20 Claims, 12 Drawing Sheets

COMPUTATIONALLY-AUGMENTED VIDEO DISPLAY FACILITATING PACKAGE HANDLING

TECHNICAL FIELD

Embodiments described herein generally relate to transportation or handling of packages, such as parcels, luggage, and other transportable articles and, more particularly, to solutions that support the manual handling of packages using augmented video displays.

BACKGROUND

Package handling technologies are widely deployed across many industries. A few examples include sorting facilities operated by parcel transport service providers, luggage conveyance systems at airports and other transportation hubs, package handling at warehouses or stockrooms at factories retail establishments, military bases, hospitals and, generally, any organization that sends, receives, stores, or sorts packages.

Oftentimes, packages are handled manually. Even in large automated package-processing centers, irregular packages, such as oversized, odd-shaped and hazardous material-containing packages may be sorted by hand. Manual operations introduce operator errors, which may harm the level of service or efficiency in the operations of the package-handling facility. Operator errors may result in misrouted packages or damage to packages from mishandling. Most critically, human involvement exposes the handling operators, or those downstream in the logistics chain, to safety risks. For instance, mishandled packages containing hazardous items or materials may be a source of danger to people or the environment.

On the other hand, the presence of human operators in package-handling facilities allows a higher level of service for special packages or better responsiveness to irregularities than can be achieved by more automated systems. Practical solutions are needed to support manual package handling that reduce the risk associated with operator errors. In addition, technological improvements to manual package handling would be beneficial to strengthen the "human factor" that can improve service levels and avoid or solve problems.

SUMMARY

Aspects of the embodiments are generally directed to an automated package-handling support apparatus, method, and operations software. In some embodiments, a video-camera interface is to receive motion-video observation of a target area in a package-handling facility. The motion-video observation includes packages in the target area. A display interface may be provided to display output to at least one display device that is configured to produce video images visible to a human operator proximate the target area. An operator support system includes a controller operatively coupled to the video-camera interface and to the display interface. The controller is to process the motion-video observation to detect the packages in the target area and retrieve at least one package-specific routing-related attribute and at least one package-specific property for each of the packages.

In addition, the controller is to generate the video output to include: (a) a first portion representing the motion-video observation of the packages in the target area: and (b) a second portion that includes a package-specific dynamic informational overlay corresponding to each of the packages in the target area. The dynamic informational overlay is visually associated with corresponding individual packages and includes package-handling prompting for the operator based on the at least one package-specific routing-related attribute, and on the at least one package-specific property of each of the packages.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Aspects of the embodiments are directed to package-handing technologies. In the present context, a package is a transportable item that may be handled by a human operator. Examples of packages include, without limitation, parcels, suitcases or other items of luggage, rigid containers, soft containers, boxes, envelopes, or the like, in various form factors. For the sake of brevity, all types of transportable items are referred to herein as packages.

Applications of some embodiments described herein include, without limitation, package-handling facilities such as sorting centers, transportation hubs, shipping/receiving/warehousing areas of a wide range of organizations such as military bases, factories, hospitals, or retail establishments, as well as transport vehicles such as ships, aircraft, trucks, railcars, or the like.

Figure 1A:
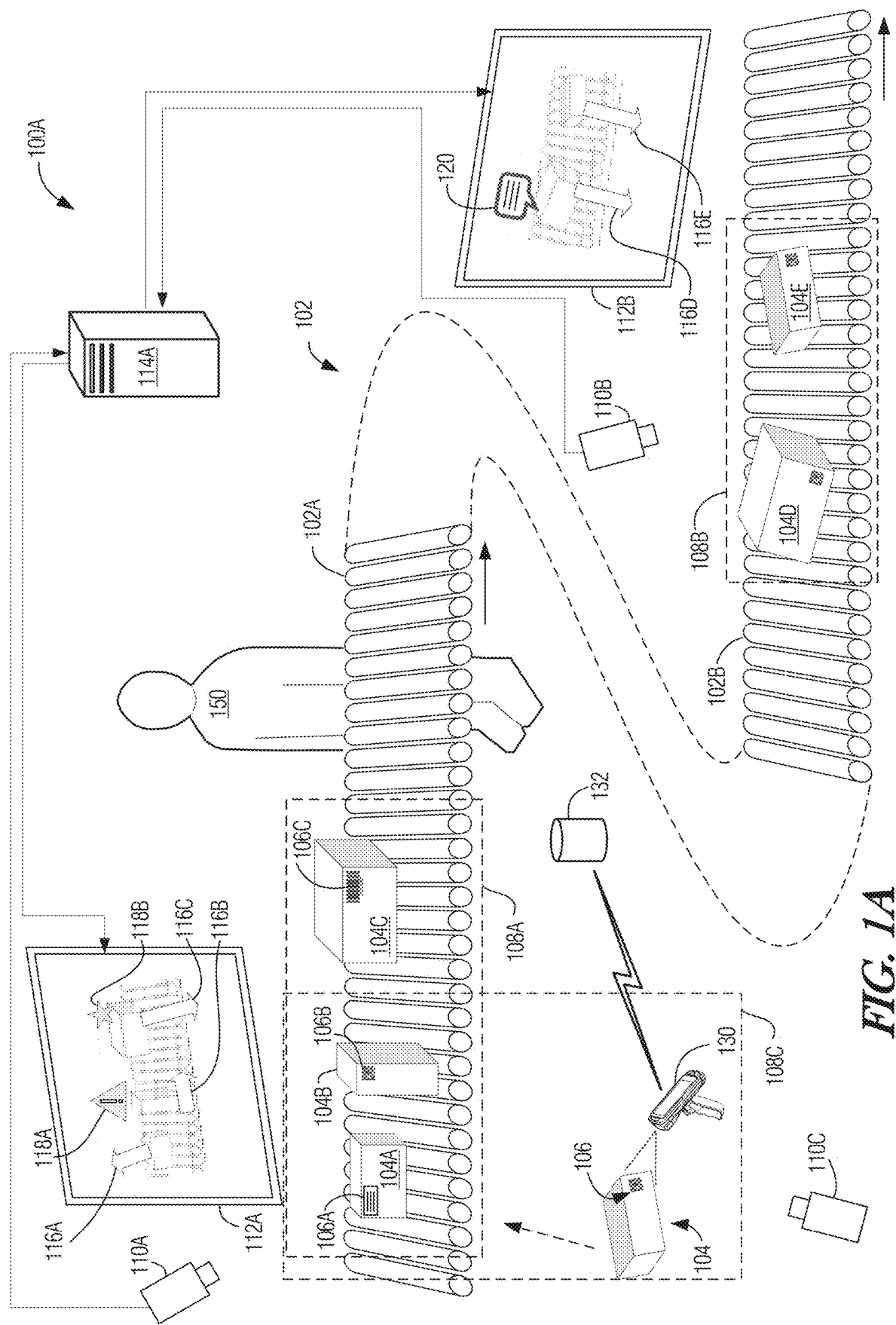
FIGS. 1A and 1B are diagrams illustrating examples of package-handling facilities that implement some aspects of the embodiments.
Figure 1B:
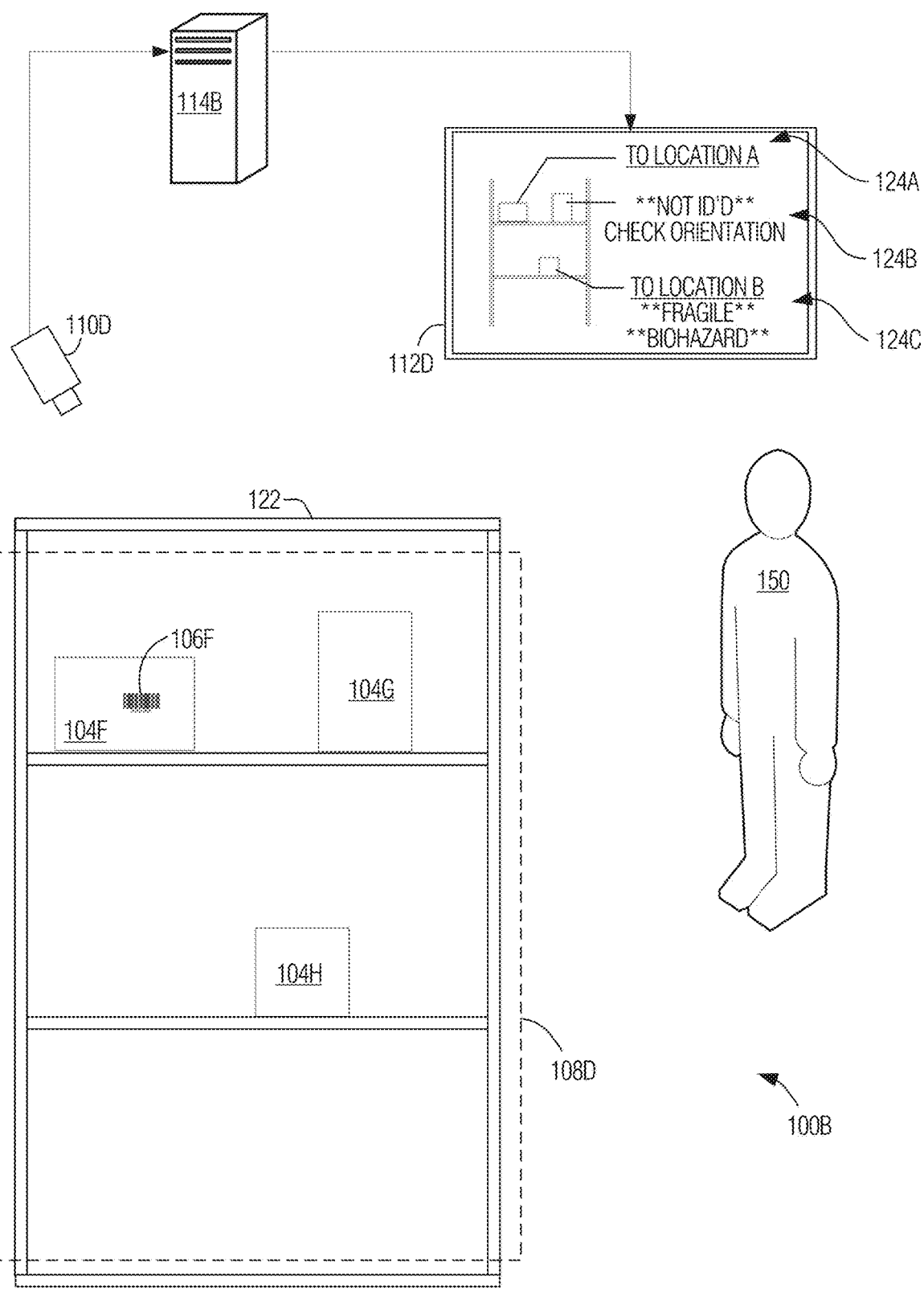

FIGS. 1A and 1B are diagrams illustrating examples of package-handling facilities that implement some aspects of the embodiments. FIG. 1A depicts package-handling facility 100A, which includes a package-conveyance system 102 (including first conveyor portion 102A and second conveyor portion 102B). Conveyor portions 102A and 102B may represent different portions of the same conveyance path, or different conveyance paths on which various packages 104 may be placed. As depicted, first conveyor portion 102A carries package 104A, package 104B, and package 104C. Second conveyor portion 102B carries package 104D and package 104E as shown.

Packages 104 are handled at package-handling facility 100A by one or more human operators 150. Operator 150 may be called upon to route or place packages 104 onto portions of conveyance system, 102 or into particular bins, carts, storage shelves, vehicles, or holding areas, as some examples. In addition, operator 150 may be called upon to adjust orientation or positioning of packages 104.

According to some aspects, a display system is provided to aid operator 150 with these, and other tasks relating to package handling. In various embodiments, the display system provides package-specific prompting for operator 150 to take certain actions with respect to individual packages. The system as depicted in the example of FIG. 1A includes cameras 110A and 110B (referred to collectively as cameras 110), display 112A and display 112B (referred to collectively as displays 112), and controller 114A.

The package-specific prompting is facilitated by recognizing individual packages 104. Each package 104 is uniquely identifiable by an ID indicator 106. In general, ID indicators 106 may take a variety of forms. For example, package 104A has an ID indicator 106A in the form of a shipping label that includes an alphanumeric tracking number printed thereupon. Package 104B has an ID indicator 106B in the form of a 2D barcode. Package 104C has an ID indicator 106C in the form of a 1D barcode. Other styles of ID indicator 106 are also contemplated, such as radio-frequency identification (RFID) tags. In other embodiments, the package contents may have a provision for providing their respective IDs apart from any indicia on the packaging such as using RF or other wireless communication technology provided as part of the package content.

In some embodiments, each of cameras 100 and controller 114A work to locate ID indicators 106 of respective packages 104, and to read ID indicators 106 to identify individual packages 104 and associate each package with its corresponding captured image. In related embodiments, controller 114A interacts with, ID scanner 130, which works to read ID indicators 106 and record the ID indicators 106 in a data structure 132 accessible by processor 114A.

Each camera 110 is directed to capture a field of view of a corresponding target area 108. In the example of FIG. 1A, target area 108A of first conveyor portion 102A, and target area 108B of second conveyor portion 102B are arranged to include a view of packages 104 on respective portions of first conveyor portion 102A and second conveyor portion 102B. In a related example, camera 110C (shown without depiction of information flow towards controller 114A for clarity) may capture target area 108C that includes a view of packages 104 as they are scanned via ID scanner 130 and placed on first conveyor portion 102A. This view of target area 108C facilitates association of the identified packages 104, with the respective locations of those packages 104 on package-conveyance system 102. The video captured by camera 110C may or may not be shown on a display 112, according to various embodiments.

Each display 112 may be implemented as a monitor, such as a LCD/LED monitor, or a video projector, for example. In various embodiments, there may be one or more display 112 associated with each target area 108. In other various embodiments, one or more target areas 108 may be associated with an individual display 112. For clarity, FIG. 1A depicts a single display 112A for target area 108A, and a single display 112B for target area 112B. Each display 112 shows its corresponding target area 108 in real time, or with a specific time delay. Real-time display in the present context includes the display of events as they are occurring, or the display of those events with an imperceptible or insignificant delay (e.g., <1 second). A specific delay may be applied to support operators 150 working at a location downstream of the target area 108 such that the image of packages on package-conveyance system 102 is displayed to operator 150 when those packages are within reach of operator 150.

Controller 114A coordinates the capture of video by cameras 110 with the corresponding display of the captured video on displays 112. In addition, controller 114A displays a dynamic overlay on the captured video according to various embodiments. The dynamic overlay may include graphics or text that provides package-specific prompts (including instructions, guidance, or package-specific information) relating to the handling of individual packages 104 for the benefit of operator 150.

FIG. 1B illustrated additional examples in the context of package-handling facility 100B, in which packages 104F-104H (also referred to generally as packages 104) are stationary. In this example, camera 110D, display 112D and controller 114B work together to capture target area 108D of packages 104 sitting on a shelf or holding area 122, and display package-specific prompts 124A-124C corresponding respectively to packages 104F-104H.

The package-specific prompts may include routing prompts depicted as routing prompt 116A, routing prompt 116B, and routing prompt 116C appearing on display 112A, routing prompts 116D and 116E appearing on display 112B, and the routing prompts 124A-124C appearing on display 112D. These routing prompts, collectively referred to as routing prompts 116, may include arrows or other graphical indicia, or text, placed on, over, or near, the corresponding packages 104 such that each routing prompt 116 is unambiguously associated with its corresponding package. In a related embodiment (not shown), a single routing prompt 116 may correspond to multiple packages that are to be routed in the same manner.

The package-specific prompts may also include information pertaining to the package contents, package priority, specific handling requirements, or situational notifications relating to autonomously-detected conditions or circumstances pertaining to individual packages 104. In the examples depicted in FIG. 1A, the package-specific prompts may include graphical symbols or shapes 118A, 118B, or combined graphical-textual informative call-out 120, or a text box overlay with a pointer or other visual association with the corresponding package 104, as depicted with callouts 124A-124C, which show both, routing information, and package-property information.

According to a non-limiting set of example prompting content, the package-specific prompts may indicate routing-related information in addition to the routing path or segment to be taken, including the handling priority (e.g., urgent), a specific time to departure of the transport vehicle on which the package is to be loaded, and the like.

In related embodiments, the package-specific prompts may indicate one or more package characteristics, such as (without limitation):
- hazardous/poisonous/flammable contents
- heavy weight
- uneven weight distribution
- contents under pressure
- biohazard
- corrosive material
- environmental pollutant
- contains stored energy
- magnetic
- fragile
- contains liquid
- the presence of a "this side up" label
- contains food product
- contains medicine
- contains a living organism or live tissue
- high value In other related embodiments, the package-specific prompts may indicate one or more visual warnings based on autonomously-detected situational conditions, such as (without limitation):
- wrong path (when the path is correctable at the handling point served by the display 112)
- wrong place (not correctable at the handling point)
- proximity rule violation (e.g., for a package requiring a specified spacing from other packages)
- too close to a neighboring package having hazardous content
- orientation rule violation (e.g., wrong side up, wrong orientation for handling by conveyance equipment, etc.)

In some embodiments, where the packages 104 are in motion relative to the target area 108, the package-specific prompts are animated to move with their respective packages as those packages traverse the target area 108 or are moved within target area 108. Accordingly, controllers 114A, 114B may be configured to track the movement of packages 104 using machine-vision techniques.

In related embodiments, the package-specific prompts may have a variable prominence (e.g., intensity, size, color, etc.) that controllers 114A, 114B adjust based on the criticality of the prompt. For instance, a prompt relating to a safety risk may be made more prominent that a non-safety-related informational prompt indicating handing priority. In another example, the prominence of a package-specific prompt may be based on the remaining time for an operator to carry out an action called for by a package-specific prompt. For instance, as a package 104 traverses target area 108 and approaches the boundary, the prominence of the prompting relating to that package 104 may be progressively increased.

Figure 2:
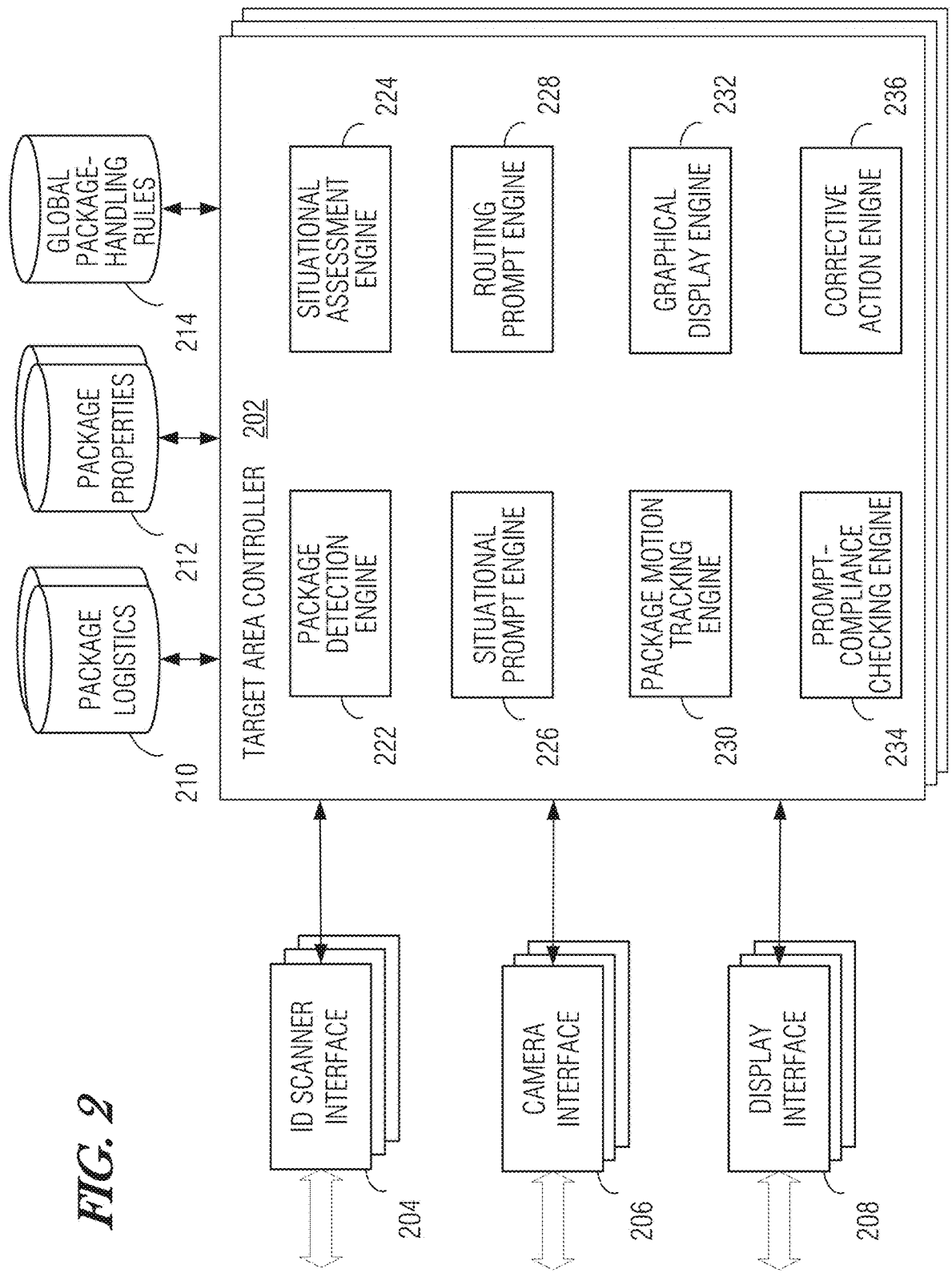
FIG. 2 is a block diagram illustrating a target-area controller, and some if its interfaces according to some embodiments.

FIG. 2 is a block diagram illustrating a target-area controller, and some if its interfaces according to some embodiments. Target-area controller 202 may be instantiated on a controller such as controller 114A or 114B (FIGS. 1A, 1B) alongside other target-area controllers of the overall system. Aspects of the target-area controller 202 or controller 114A. 114B may be implemented as part of a computing platform. The computing platform may be one physical machine, or may be distributed among multiple physical machines, such as by role or function, or by process thread in the case of a cloud computing distributed model. In various embodiments, portions of controllers 202, 114A, 114B may be configured to run in virtual machines that in turn are executed on one or more physical machines. It will be understood by persons of skill in the art that features as described below may be realized by a variety of different suitable machine implementations.

As depicted, target-area controller 202 is interfaced with one or more ID scanners (such as ID scanner 130) via ID scanner interface 204. Likewise, target-area controller 202 is interfaced with one or more cameras (such as camera 110) via camera interface 206; and with one or more displays (such displays 112) via display interface 208. Target-area controller 202 is also interfaced with databases 210-214. These include one or more package logistics databases 210 containing destination, routing, priority, and other logistics-related information for individual packages 104; one or more package properties databases 212 containing information regarding the content or characteristics of individual packages 104.

Global package-handling rules database 214 contains criteria pertinent to the operation of the display system for supporting operators in package-handling facilities. The criteria may be specific to the facility or to the target area. This criteria may include various decision-criteria and thresholds for taking corrective action, time limits relating to the conveyance system speed, if applicable, workflow rules defining actions to be taken in response to detected faults or package-handling failures, criteria for detecting faults or handling failures, rules defining the package-specific prompts to be displayed, their formats, and their prominence variability, and the like.

Target area controller 202 includes various engines, each of which is constructed, programmed, configured, or otherwise adapted, to carry out a function or set of functions, as detailed below. The term engine as used herein means a tangible device, component, or arrangement of components implemented using hardware, such as by an application specific integrated circuit (ASIC) or field-programmable gate array (FPGA), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

In an example, the software may reside in executable or non-executable form on a tangible machine-readable storage medium. Software residing in non-executable form may be compiled, translated, or otherwise converted to an executable form prior to, or during, runtime. In an example, the software, when executed by the underlying hardware of the engine, causes the hardware to perform the specified operations. Accordingly, an engine is physically constructed, or specifically configured (e.g., hardwired), or temporarily configured (e.g., programmed) to operate in a specified manner or to perform part or all of any operations described herein in connection with that engine.

Considering examples in which engines are temporarily configured, each of the engines may be instantiated at different moments in time. For example, where the engines comprise a general-purpose hardware processor core configured using software: the general-purpose hardware processor core may be configured as respective different engines at different times. Software may accordingly configure a hardware processor core, for example, to constitute a particular engine at one instance of time and to constitute a different engine at a different instance of time.

In certain implementations, at least a portion, and in some cases, all, of an engine may be executed on the processor(s) of one or more computers that execute an operating system, system programs, and application programs, while also implementing the engine using multitasking, multithreading, distributed (e.g., cluster, peer-peer, cloud, etc.) processing where appropriate, or other such techniques. Accordingly, each engine may be realized in a variety of suitable configurations, and should generally not be limited to any particular implementation exemplified herein, unless such limitations are expressly called out.

In addition, an engine may itself be composed of more than one sub-engines, each of which may be regarded as an engine in its own right. Moreover, in the embodiments described herein, each of the various engines corresponds to a defined functionality; however, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

As shown, target-area controller 202 includes package detection engine 222, situational assessment engine 224, situational prompt engine 226, routing prompt engine 228, package motion tracking engine 230, graphical display engine 232, prompt-compliance checking engine 234, and corrective action engine 236. Notably, the embodiments shown in FIGS. 2-10 are illustrative of a full-featured example with many, (not necessarily all) of the features described herein. In various related embodiments, additional engines may be included, and some may be omitted. A variety of combinations of these engines or their general functionality are contemplated.

Figure 3:
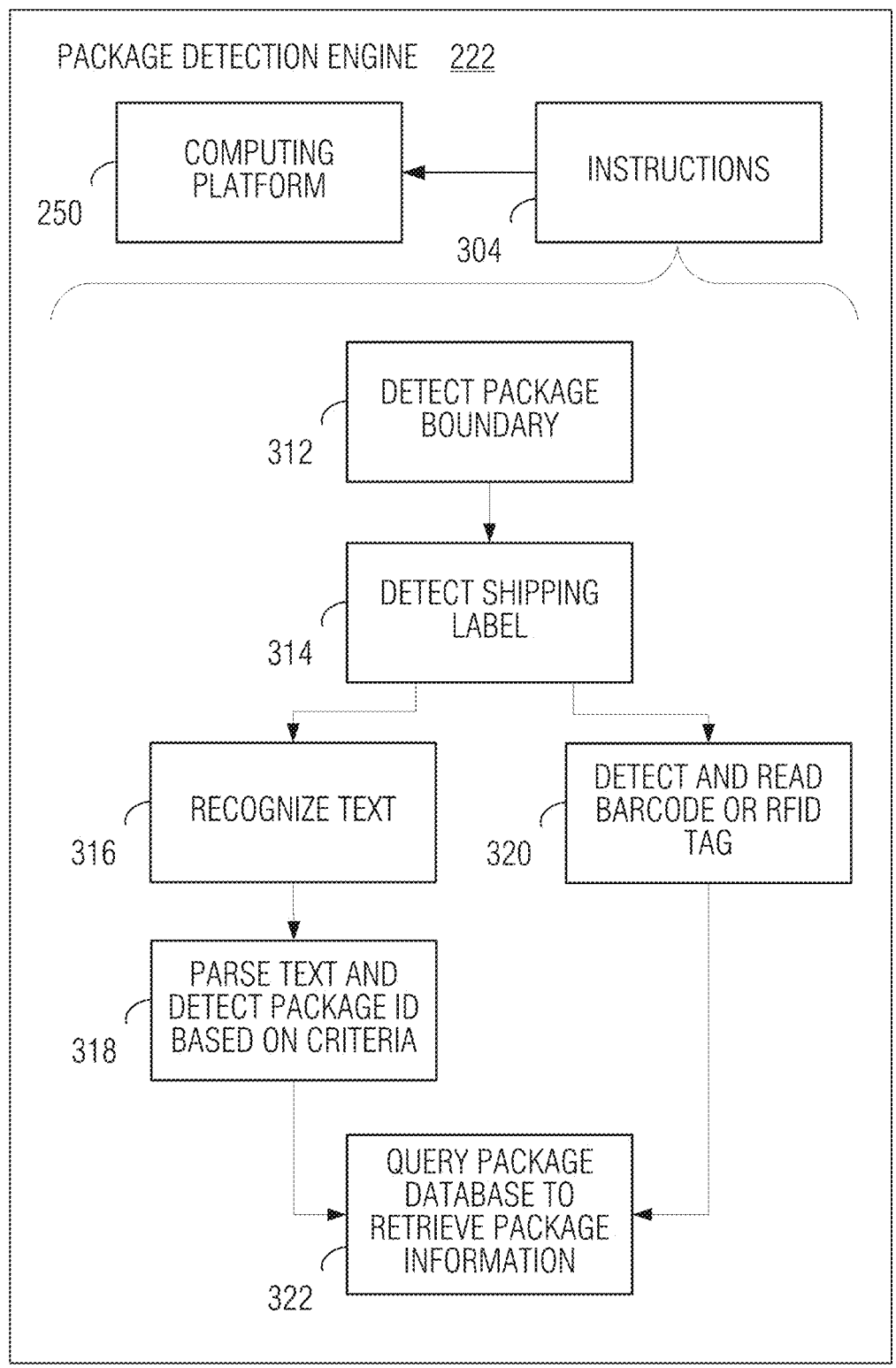
FIG. 3 is a functional block diagram illustrating a package detection engine of the target-area controller of FIG. 2 in detail according to some embodiments.

FIG. 3 is a functional block diagram illustrating package detection engine 222 of the target-area controller of FIG. 2 in detail according to some embodiments. Package detection engine 222 includes computing platform 250, including a tangible data-storage arrangement such as a data store, volatile or non-volatile, containing instructions 304 executable on computing platform 250. Instructions 304, when executed, cause the computing platform 250 to implement the following process.

At 312, a package boundary is detected by processing of the video image frames. At 314, a shipping label or other ID indicator is detected by further processing of the video image frames. Depending on the type of ID indicator, operations 316-318, or 320 are performed. Operations 316-318 are applicable to printed alpha-numeric indicia. At 316, a text-recognition procedure is performed, and at 318, the text is parsed to discern the package ID (e.g., tracking number) based on detection criteria. Separately, at 320, a barcode or RFID tag is read using optical or radio-communication technology. At 322, one or more databases, such as package logistics database 210, or package properties database 212, is queried to obtain routing and properties of the package. The process is repeated for other packages entering the field of view of the camera.

In other embodiments that utilize an ID scanner such as scanner 130, the scanner's output is fed directly to operation 322 to perform the lookup.

Figure 4:
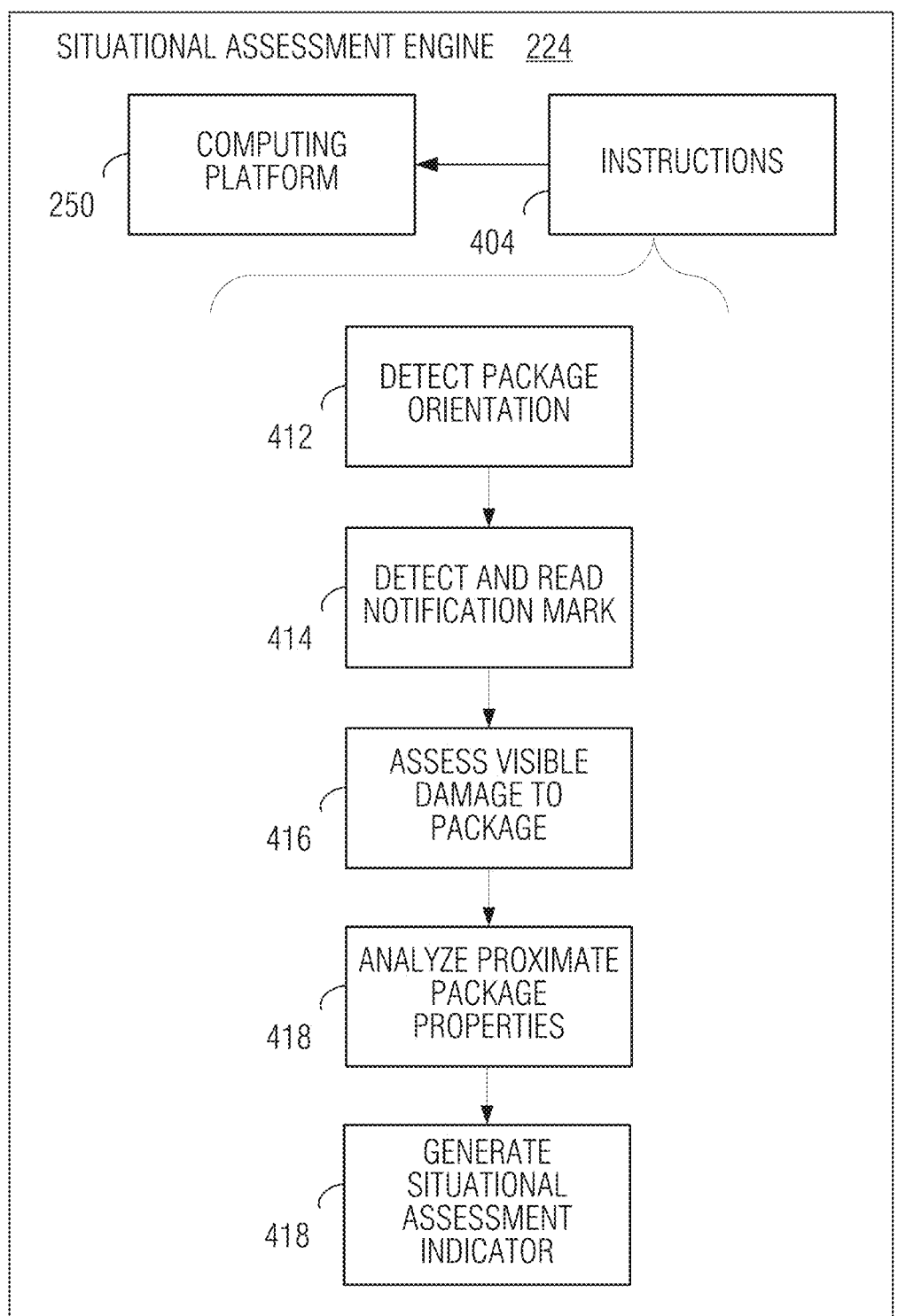
FIG. 4 is a functional block diagram illustrating a situational assessment engine of the target-area controller of FIG. 2 in detail according to some embodiments.

FIG. 4 is a functional block diagram illustrating situational assessment engine 224 of the target-area controller of FIG. 2 in detail according to some embodiments. As depicted, situational assessment engine 224 includes computing platform 250, including a tangible data-storage arrangement such as a data store, volatile or non-volatile, containing instructions 404 executable on computing platform 250. Instructions 404, when executed, cause the computing platform 250 to implement the following process.

At 412, situational assessment engine 224 performs analysis of the video frames to detect the package orientation (e.g., standing on short side, etc.). At 414, situational assessment engine 224 detects and reads any notification marks (e.g., "this side up," "fragile," "hazard" or the like) that may be on the package. At 416, any visible damage to the package is assessed by analysis of the video frames. Examples of detectable damage include tears, crumpled corners, open box flaps, crushed packages, etc. At 418, the properties of proximate (e.g., neighboring or adjacent) packages is compared against any applicable proximity criteria. For example, proximity criteria for a package containing a biohazard (read as part of the package properties) may specify that no food or medicine-containing packages may be within 3 meters. At 418, situational assessment engine 224 generates a situational assessment indicator for use by other engines. The situational assessment indicator may be in the form of a machine-readable report or a tagged file, for instance, which is human-readable as well. The process is repeated for each additional package in the target area.

Figure 5:
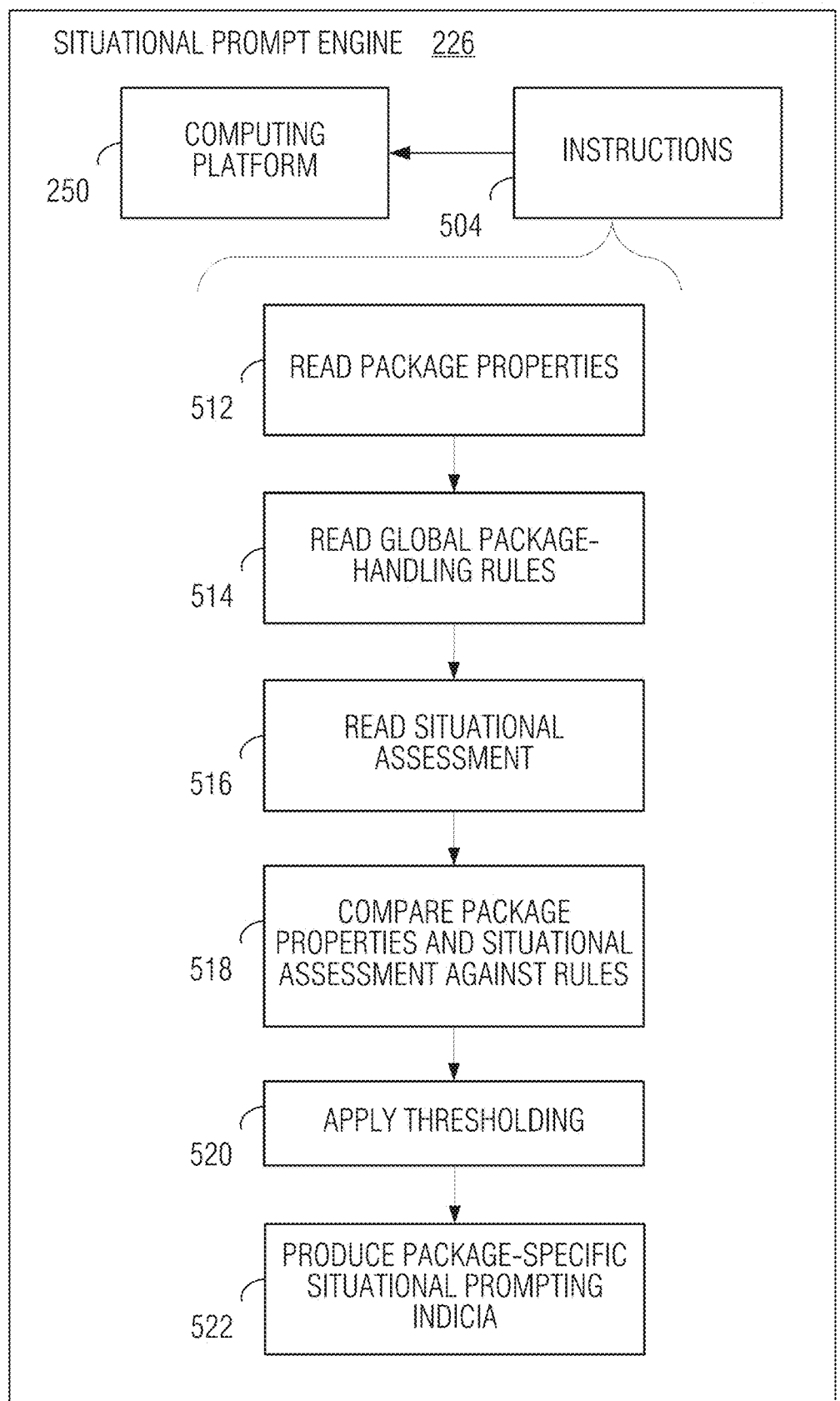
FIG. 5 is a functional block diagram illustrating a situational prompt engine of the target-area controller of FIG. 2 in detail according to some embodiments.

FIG. 5 is a functional block diagram illustrating situational prompt engine 226 of the target-area controller of FIG. 2 in detail according to some embodiments. As depicted, situational prompt engine 226 includes computing platform 250, including a tangible data-storage arrangement such as a data store, volatile or non-volatile, containing instructions 504 executable on computing platform 250. Instructions 504, when executed, cause the computing platform 250 to implement the following process.

At 512, the package properties from database 212 are read for a given package in the target area. At 514, situational prompt engine 226 reads the global package-handling rules from database 214. At 516, the situational assessment produced by situational assessment engine 224 is read. At 518, the package properties and situational assessment are compared against the global package-handling rules. The comparison may produce binary or scored output. In the latter case, the scored output is compared against applicable decision thresholds to determine if any situational-based prompting is called for. At 522, package-specific situational prompting is produced as called for. The process is repeated for each additional package in the target area.

Figure 6:
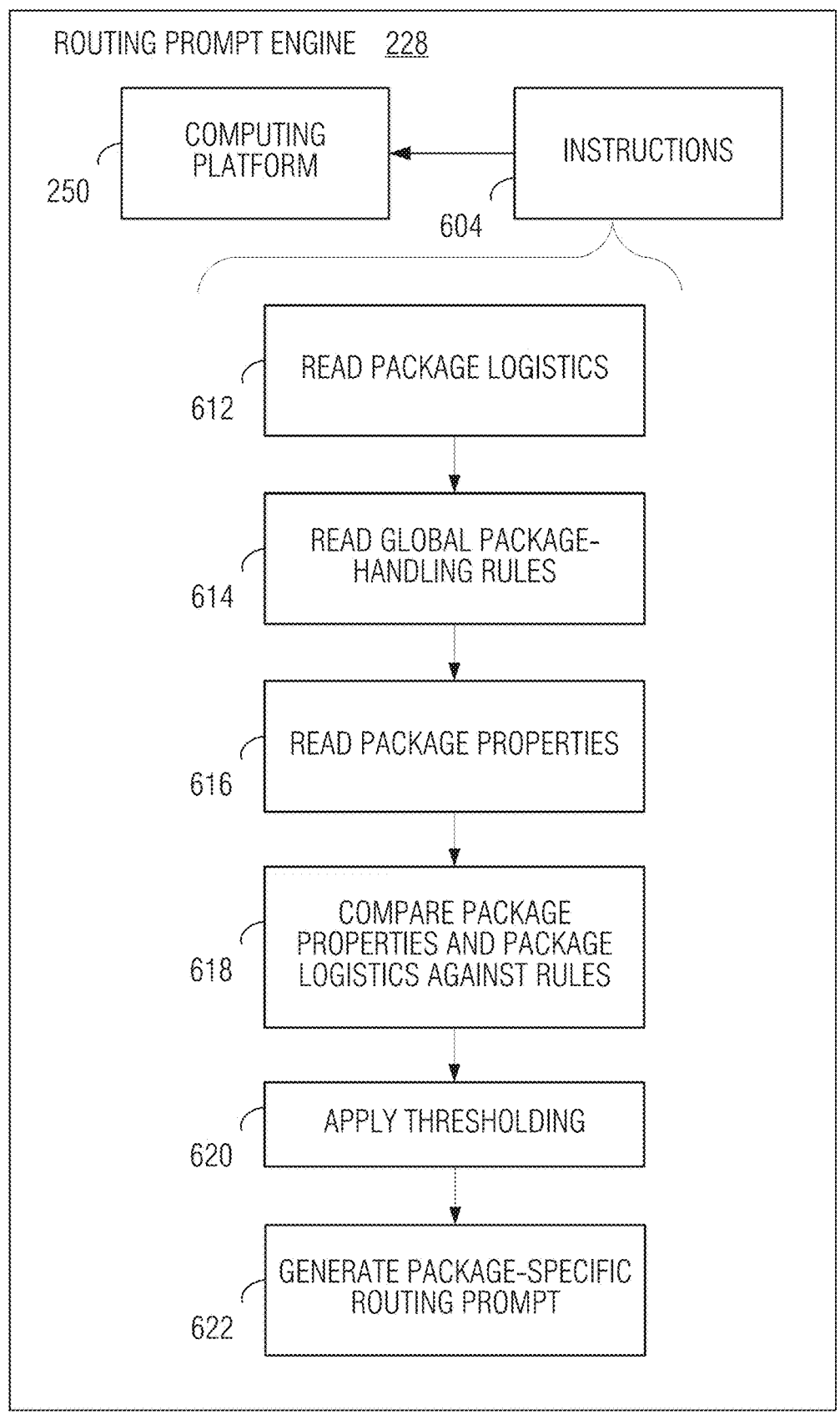
FIG. 6 is a functional block diagram illustrating a routing prompt engine of the target-area controller of FIG. 2 in detail according to some embodiments.

FIG. 6 is a functional block diagram illustrating routing prompt engine 228 of the target-area controller of FIG. 2 in detail according to some embodiments. As depicted, routing prompt engine 228 includes computing platform 250, including a tangible data-storage arrangement such as a data store, volatile or non-volatile, containing instructions 604 executable on computing platform 250. Instructions 604, when executed, cause the computing platform 250 to implement the following process.

At 612, package logistics database 210 is read. At 614, routing prompt engine 228 reads the global package-handling rules from database 214. At 616, the package properties from database 212 are read for a given package in the target area. At 618, routing prompt engine 228 compares the package properties and package logistics (e.g., routing information, priority information, etc.) against the global package-handling rules to provide suitable additional or modified handling prompting during the routing. At 620, decision thresholding is applied to determine which prompting is called for. At 622, routing prompt engine 228 generates the package-specific routing prompt(s). The process is repeated for each additional package in the target area.

Figure 7:
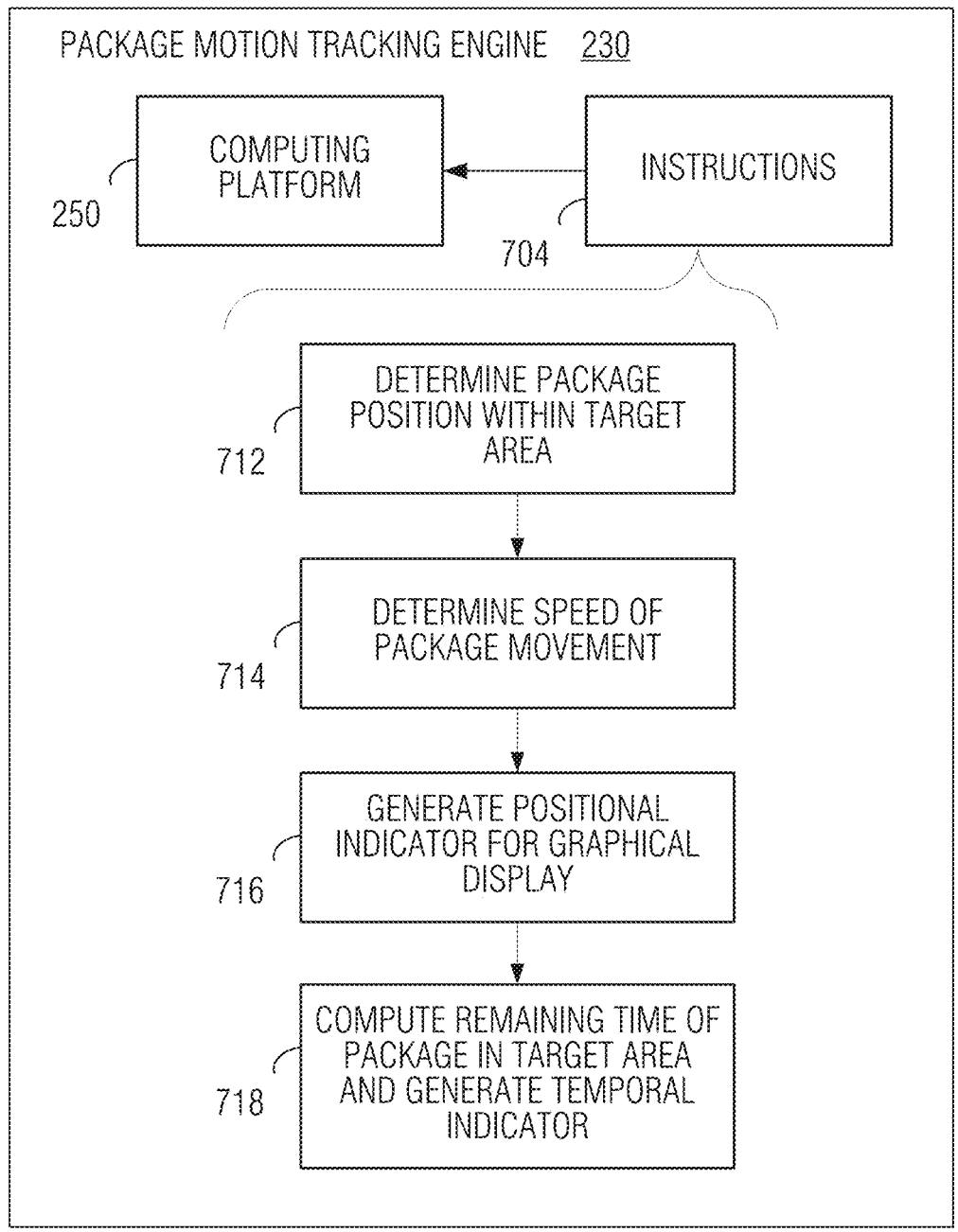
FIG. 7 is a functional block diagram illustrating a package motion tracking engine of the target-area controller of FIG. 2 in detail according to some embodiments.

FIG. 7 is a functional block diagram illustrating package motion tracking engine 230 of the target-area controller of FIG. 2 in detail according to some embodiments. As depicted, package motion tracking engine 230 includes computing platform 250, including a tangible data-storage arrangement such as a data store, volatile or non-volatile, containing instructions 704 executable on computing platform 250. Instructions 704, when executed, cause the computing platform 250 to implement the following process.

At 712, package motion tracking engine 230 determines the position of a package within the target area using machine-vision techniques. At 714, the speed of the package movement is detected. At 716, package motion tracking engine 230 generates a positional indicator to be used in animating the dynamic prompts to track the moving packages. At 718, package motion tracking engine 230 computes the remaining time that the package is to remain in the target area, and generates a temporal indicator representing the same. The temporal indicator is to be used by other engines according to some embodiments to determine whether to provide enhanced-prominence prompting, for example. The process is repeated for each additional package in the target area.

Figure 8:
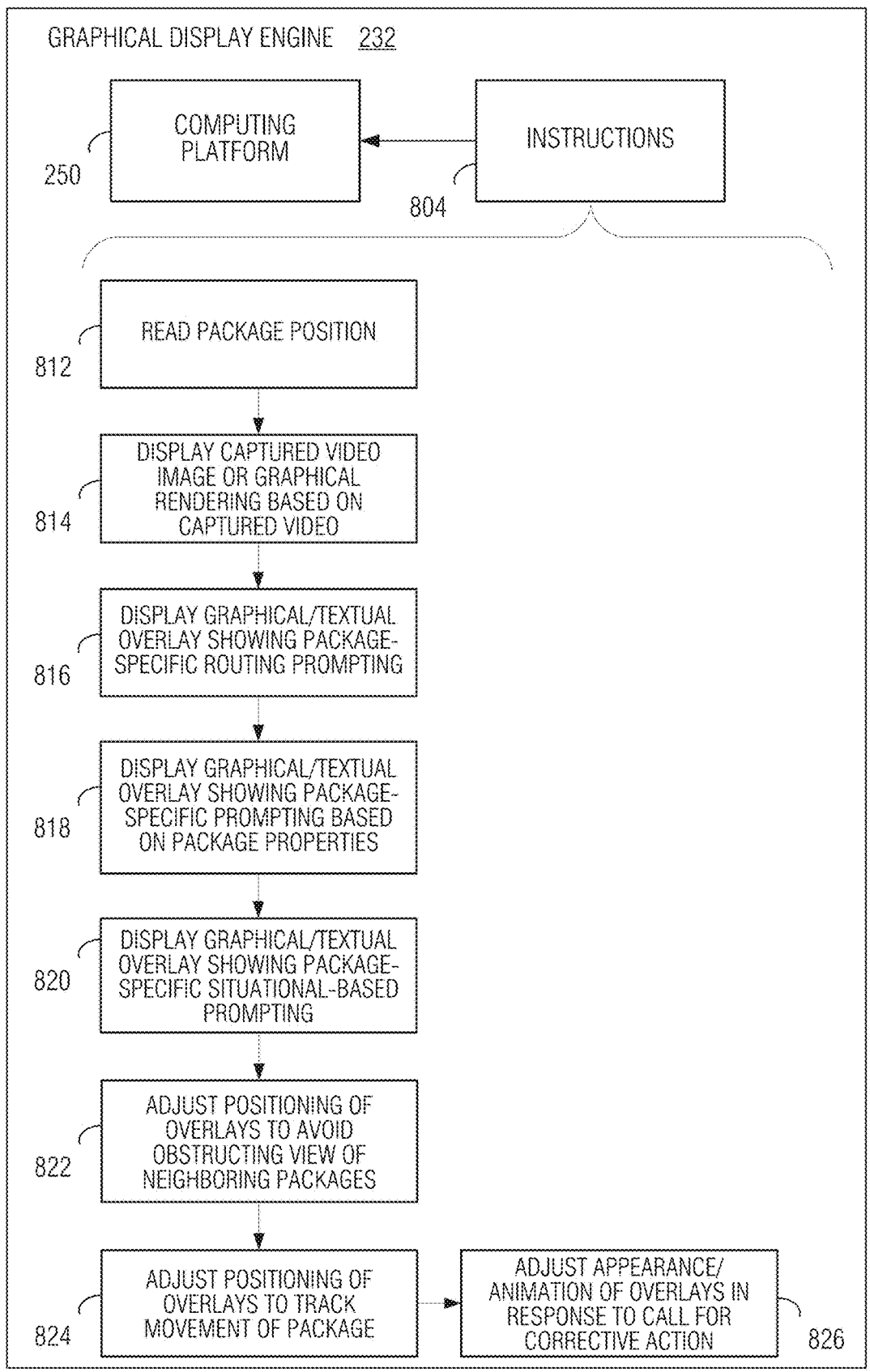
FIG. 8 is a functional block diagram illustrating a routing prompt engine of the target-area controller of FIG. 2 in detail according to some embodiments.

FIG. 8 is a functional block diagram illustrating routing prompt engine 232 of the target-area controller of FIG. 2 in detail according to some embodiments. As depicted, graphical display engine 232 includes computing platform 250, including a tangible data-storage arrangement such as a data store, volatile or non-volatile, containing instructions 804 executable on computing platform 250. Instructions 804, when executed, cause the computing platform 250 to implement the following process.

At 812, the package position determined by package motion tracking engine 230 is read by graphical display engine 232. At 814, graphical display engine 232 generates instructions for the display driver to display the captured video on the display. Hereinafter, by similar operations, graphical display engine 232 will be said to display the subject information. In related embodiments, graphical display engine 232 displays a graphical representation, such as a rendered representation of the packages in the target area, in lieu of displaying a part of all of the captured video frames. In this type of embodiment, the graphical representation is based on the captured video frames, but may have improved clarity by omitting extraneous items from the field of view.

At 816, graphical display engine 232 displays the graphical or textual overlay showing package-specific routing for each package visible in the target area display. At 818, graphical display engine 232 displays a graphical or textual overlay showing package-specific prompting based on the package properties for each package in the target area display. At 820, graphical display engine 232 displays a graphical or textual overlay showing package-specific situational-based prompting for each package in the target area. Notably, the overlay-based prompting is not limited to strictly providing instructions for the operator; rather, prompting entails providing package-handling-pertinent information for operators to take into account.

At 822, graphical display engine 232 adjusts the positioning and size of the overlays to avoid obstructing critical items, such as neighboring packages, if applicable. At 824, graphical display engine 232 animates the overlays for each package in the target area to track the movement of the packages, if applicable. At 826, graphical display engine 232 adjusts the presentation, or animates the overlays in response to any calls for corrective action by operators, to make those prompts more prominent for operators to notice.

Figure 9:
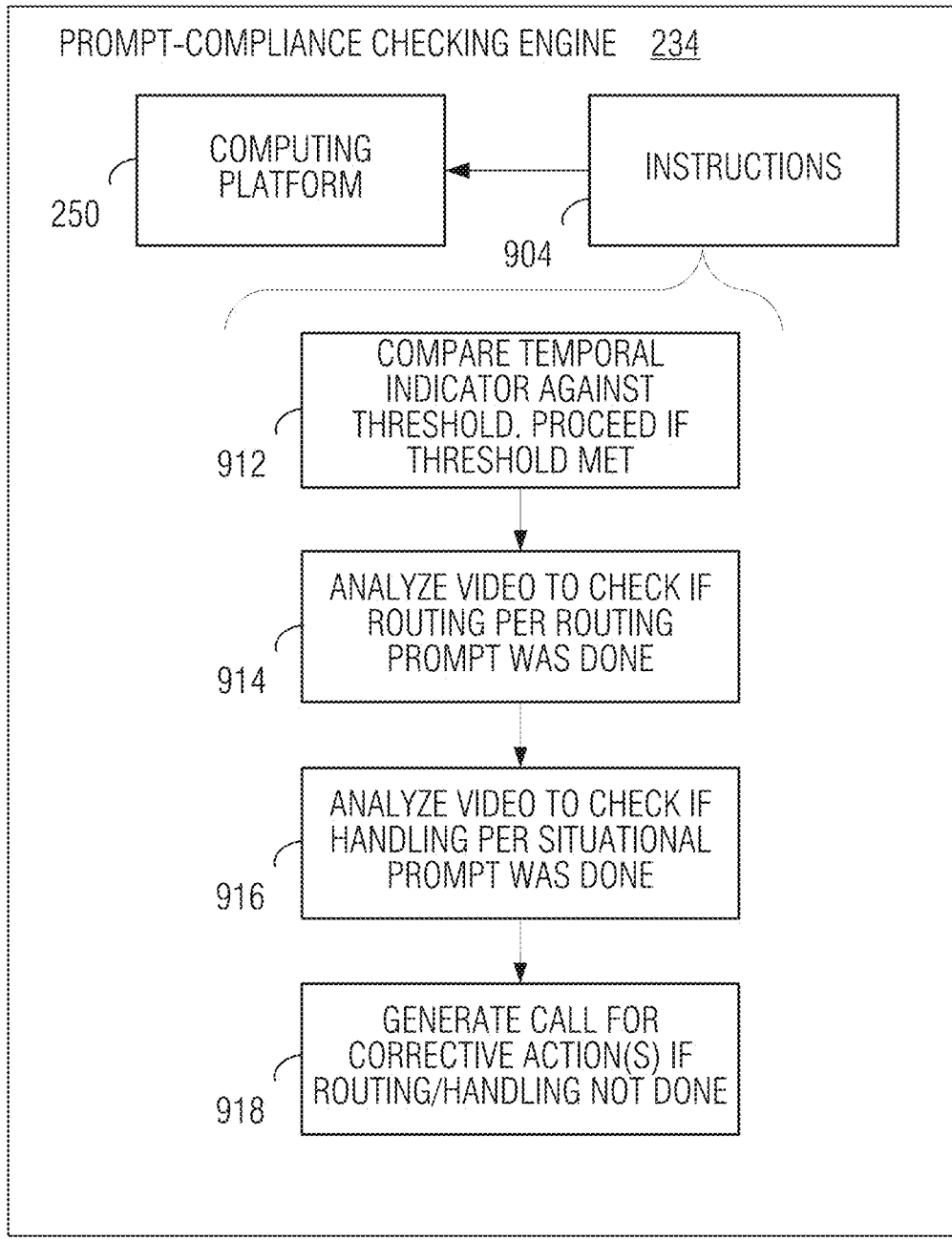
FIG. 9 is a functional block diagram illustrating a routing prompt-compliance checking engine of the target-area controller of FIG. 2 in detail according to some embodiments.

FIG. 9 is a functional block diagram illustrating routing prompt-compliance checking engine 234 of the target-area controller of FIG. 2 in detail according to some embodiments. As depicted, prompt-compliance checking engine 234 includes computing platform 250, including a tangible data-storage arrangement such as a data store, volatile or non-volatile, containing instructions 904 executable on computing platform 250. Instructions 904, when executed, cause the computing platform 250 to implement the following process.

At 912, prompt-compliance checking engine 234 compares the temporal indicator provided by package motion tracking engine 230 against an applicable decision threshold to determine whether each package is ripe for compliance checking. This threshold test allows some predefined amount of time for operators to respond to given prompts before checking whether the prompted actions were carried out. This enhances computational efficiency by avoiding premature checking operations.

At 914, prompt-compliance checking engine 234 analyzes the captured video frames to check if each prompted action by the routing prompts for each package was carried out by the operator. At 916, prompt-compliance checking engine 234 analyzes the captured video frames to check if the package handling for each package was done in accordance with each situational prompt. At 918, prompt-compliance checking engine 234 generates a call for corrective action by the operator if any prompted routing or handling action was not done as expected.

Figure 10:
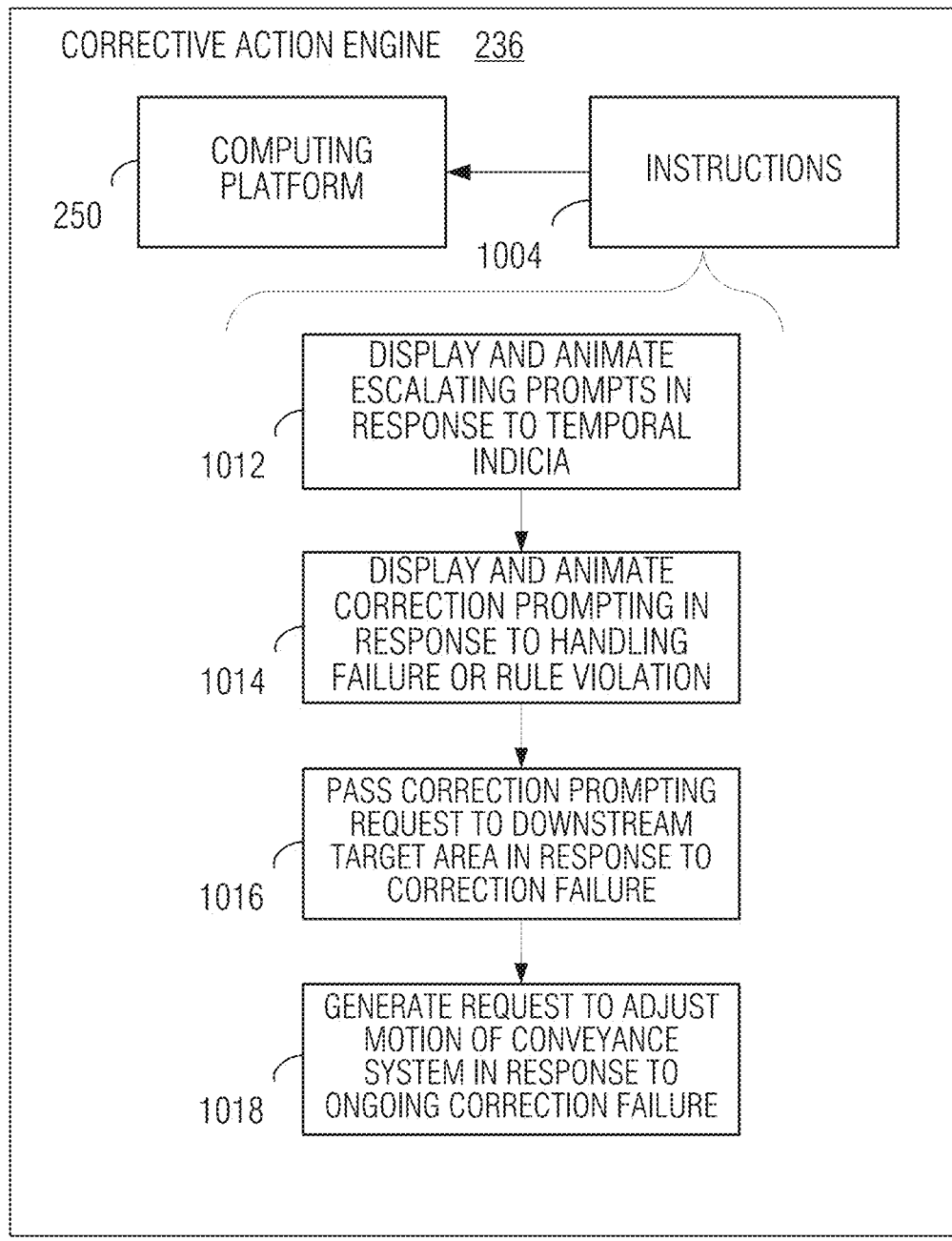
FIG. 10 is a functional block diagram illustrating a corrective action engine of the target-area controller of FIG. 2 in detail according to some embodiments.

FIG. 10 is a functional block diagram illustrating corrective action engine 236 of the target-area controller of FIG. 2 in detail according to some embodiments. As depicted, corrective action engine 236 includes computing platform 250, including a tangible data-storage arrangement such as a data store, volatile or non-volatile, containing instructions 1004 executable on computing platform 250. Instructions 1004, when executed, cause the computing platform 250 to implement the following process.

At 1012, corrective action engine 236 displays and animates escalating-prominence prompts for each package in the target area in response to the temporal indicia (i.e., as those packages move toward exiting the target area). At 1014, corrective action engine 236 displays and animates correction prompting in response to a handling failure or rule violation. For example, if an improperly-oriented package is not adjusted to the correct "this side up" orientation, or if a food-containing package is in improperly-close proximity to a toxic-material-containing package, corrective prompting is issued.

At 1016, if a prompted correction is not made within the target area, corrective action engine 236 passes a request or instruction for the correction prompting to be repeated at a downstream target area. At 1018, in response to an ongoing correction failure by operators, or in response to a critical safety issue, corrective action engine 236 generates a request or instruction for slowing, stoppage, or reversal, of the conveyance system to draw attention to the potential risk, and to allow sufficient time for correction to be made or the call for correction to be manually cleared by an operator.

Figure 11:
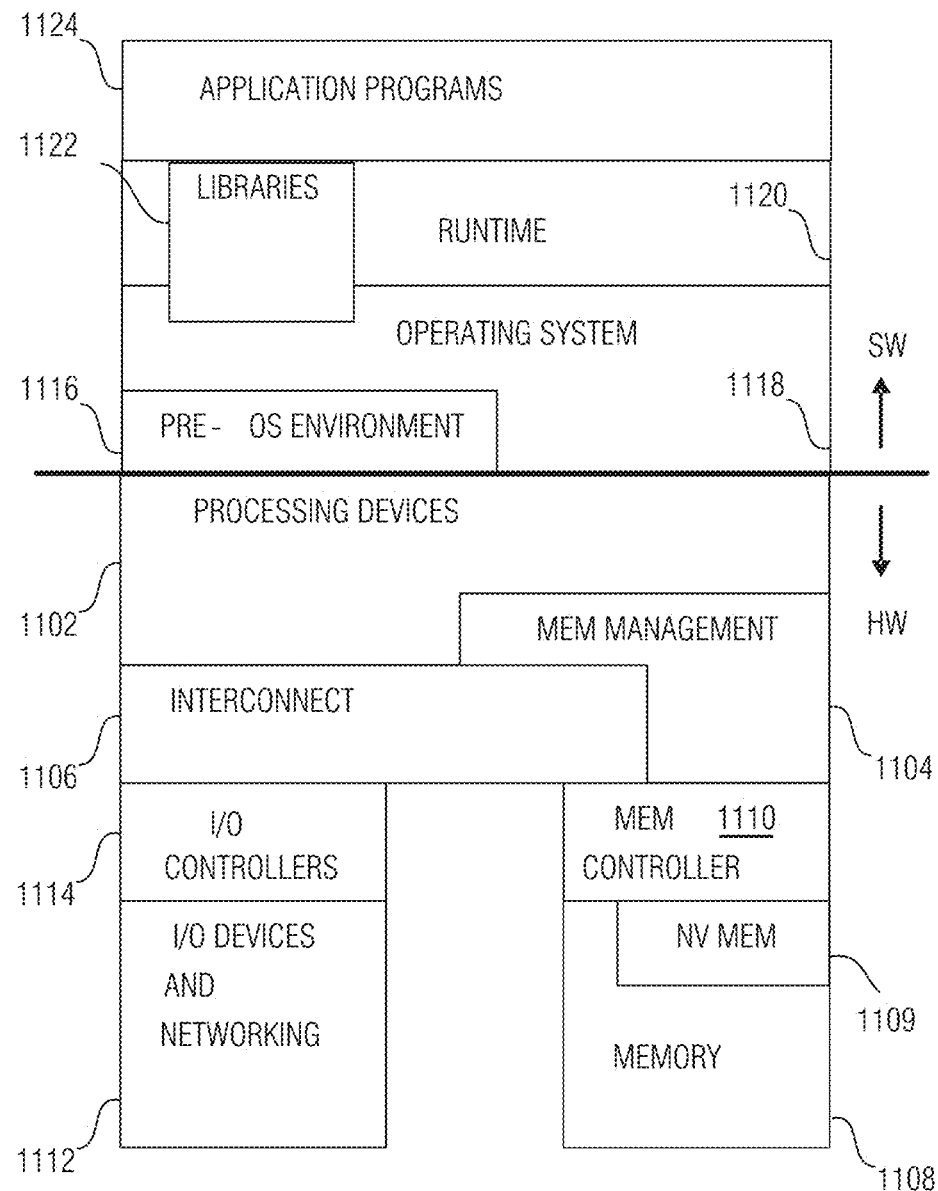
FIG. 11 is a diagram illustrating an exemplary hardware and software architecture of a computing platform in which various interfaces between hardware components and software components are shown.

FIG. 11 is a diagram illustrating an exemplary hardware and software architecture of a computing platform in which various interfaces between hardware components and software components are shown. As indicated by HW, hardware components are represented below the divider line, whereas software components denoted by SW reside above the divider line. On the hardware side, processing devices 1102 (which may include one or more microprocessors, digital signal processors, etc., each having one or more processor cores, are interfaced with memory management device 1104 and system interconnect 1106. Memory management device 1104 provides mappings between virtual memory used by processes being executed, and the physical memory. Memory management device 1104 may be an integral part of a central processing unit which also includes the processing devices 1102.

Interconnect 1106 includes a backplane such as memory, data, and control lines, as well as the interface with input/output devices, e.g., PCI, USB, etc. Memory 1108 (e.g., dynamic random access memory—DRAM) and non-volatile memory 1109 such as flash memory (e.g., electrically-erasable read-only memory—EEPROM, NAND Flash, NOR Flash, etc.) are interfaced with memory management device 1104 and interconnect 1106 via memory controller 1110. This architecture may support direct memory access (DMA) by peripherals in some embodiments. I/O devices, including video and audio adapters, non-volatile storage, external peripheral links such as USB, Bluetooth, etc., as well as network interface devices such as those communicating via Wi-Fi or LTE-family interfaces, are collectively represented as I/O devices and networking 1112, which interface with interconnect 1106 via corresponding I/O controllers 1114.

On the software side, a pre-operating system (pre-OS) environment 1116, which is executed at initial system start-up and is responsible for initiating the boot-up of the operating system. One traditional example of pre-OS environment 1116 is a system basic input/output system (BIOS). In present-day systems, a unified extensible firmware interface (UEFI) is implemented. Pre-OS environment 1116 is responsible for initiating the launching of the operating system, but also provides an execution environment for embedded applications according to certain aspects of the invention. Operating system 1118 provides a kernel that controls the hardware devices, manages memory access for programs in memory, coordinates tasks and facilitates multi-tasking, organizes data to be stored, assigns memory space and other resources, loads program binary code into memory, initiates execution of the application program which then interacts with the user and with hardware devices, and detects and responds to various defined interrupts. Also, operating system 1118 provides device drivers, and a variety of common services such as those that facilitate interfacing with peripherals and networking, that provide abstraction for application programs so that the applications do not need to be responsible for handling the details of such common operations. Operating system 1118 additionally provides a graphical user interface (GUI) that facilitates interaction with the user via peripheral devices such as a monitor, keyboard, mouse, microphone, video camera, touchscreen, and the like.

Runtime system 1120 implements portions of an execution model, including such operations as putting parameters onto the stack before a function call, the behavior of disk input/output (I/O), and parallel execution-related behaviors. Runtime system 1120 may also perform support services such as type checking, debugging, or code generation and optimization.

Libraries 1122 include collections of program functions that provide further abstraction for application programs. These include shared libraries, dynamic linked libraries (DLLs), for example. Libraries 1122 may be integral to the operating system 1118, runtime system 1120, or may be added-on features, or even remotely-hosted. Libraries 1122 define an application program interface (API) through which a variety of function calls may be made by application programs 1124 to invoke the services provided by the operating system 1118. Application programs 1124 are those programs that perform useful tasks for users, beyond the tasks performed by lower-level system programs that coordinate the basis operability of the computer system itself.

ADDITIONAL NOTES AND EXAMPLES

Example 1 is a package-handling support apparatus, comprising: a video-camera interface to receive motion-video observation of a target area in a package-handling facility, the motion-video observation to include, packages in the target area; a display interface to provide display output to at least one display device that is configured to produce video images visible to a human operator proximate the target area; and a controller operatively coupled to the video-camera interface and to the display interface, and configured to: process the motion-video observation to detect the packages in the target area and retrieve at least one package-specific routing-related attribute and at least one package-specific property for each of the packages; generate the video output to include: a first portion representing the motion-video observation of the packages in the target area: and a second portion that includes a package-specific dynamic informational overlay corresponding to each of the packages in the target area, the dynamic informational overlay being visually associated with corresponding individual packages and including package-handling prompting for the operator based on the at least one package-specific routing-related attribute, and on the at least one package-specific property of each of the packages.

In Example 2, the subject matter of Example 1 includes, wherein the package-handling prompting for each of the packages is further based on a situational assessment of the corresponding packages based on the motion-video observation of the packages in the target area.

In Example 3, the subject matter of Examples 1-2 includes, wherein the controller is further configured to track motion of the packages in the target area and to animate the package-specific dynamic informational overlay in response to the motion of the packages.

In Example 4, the subject matter of Examples 1-3 includes, wherein the controller is further configured to analyze the motion-video observation of the packages in the target area to detect a package ID corresponding to each of the packages, and to use the detected package ID to retrieve the at least one package-specific routing-related attribute, and on the at least one package-specific property of each of the packages.

In Example 5, the subject matter of Examples 1-4 includes, wherein the controller is further configured to receive a package ID corresponding to each of the packages, the package ID for each of the packages having been captured in or proximate to the target area.

In Example 6, the subject matter of Examples 1-5 includes, wherein the motion-video observation is captured by a stationary camera.

In Example 7, the subject matter of Examples 1-6 includes, wherein the at least one display device is a stationary monitor.

In Example 8, the subject matter of Examples 1-7 includes, wherein the controller is to process the motion-video observation to determine if any operator response to the package-handling prompting was made.

In Example 9, the subject matter of Examples 1-8 includes, wherein the controller is to process the motion-video observation to determine a temporal indicator of time that each of the packages moving in the target area remains in the target area, and to vary a prominence of the package-handling prompting.

In Example 10, the subject matter of Examples 1-9 includes, wherein the controller is to process the motion-video observation to determine if any operator response to the package-handling prompting was made, and to vary a prominence of the package-handling prompting based on the operator response determination.

In Example 11, the subject matter of Examples 1-10 includes, wherein the controller is to determine a call for corrective action for package handling of at least one of the packages in the target area, and to vary the package-handling prompting in response to the call for corrective action.

In Example 12, the subject matter of Examples 1-11 includes, wherein the controller is to determine a call for corrective action for package handling of at least one of the packages in the target area, and to generate a request for responsive package-handling prompting to be made at a downstream second target area.

In Example 13, the subject matter of Examples 1-12 includes, wherein the target area includes a package conveyance system on which the packages in the target area are moved, and wherein the controller is to determine a call for corrective action for package handling of at least one of the packages in the target area, and to generate a request for responsive adjustment of motion of the package conveyance system.

Example 14 is an automated method for package-handling informative support, the method comprising: receiving, by a computing platform, motion-video observation of a target area in a package-handling facility, the motion-video observation to include, packages in the target area generating display output, by the computing platform, to at least one display device that is configured to produce video images visible to a human operator proximate the target area; processing, by the computing platform, the motion-video observation to detect the packages in the target area and retrieve at least one package-specific routing-related attribute and at least one package-specific property for each of the packages; generating, by the computing platform, the video output to include: a first portion representing the motion-video observation of the packages in the target area: and a second portion that includes a package-specific dynamic informational overlay corresponding to each of the packages in the target area, the dynamic informational overlay being visually associated with corresponding individual packages and including package-handling prompting for the operator based on the at least one package-specific routing-related attribute, and on the at least one package-specific property of each of the packages.

In Example 15, the subject matter of Example 14 includes, wherein the package-handling prompting for each of the packages is further based on a situational assessment of the corresponding packages based on the motion-video observation of the packages in the target area.

In Example 16, the subject matter of Examples 14-15 includes, tracking motion of the packages, by the computing platform, in the target area and to animate the package-specific dynamic informational overlay in response to the motion of the packages.

In Example 17, the subject matter of Examples 14-16 includes, analyzing, by the computing platform, the motion-video observation of the packages in the target area to detect a package ID corresponding to each of the packages, and to use the detected package ID to retrieve the at least one package-specific routing-related attribute, and on the at least one package-specific property of each of the packages.

In Example 18, the subject matter of Examples 14-17 includes, receiving, by the computing platform, a package ID corresponding to each of the packages, the package ID for each of the packages having been captured in or proximate to the target area.

In Example 19, the subject matter of Examples 14-18 includes, wherein the motion-video observation is captured by a stationary camera.

In Example 20, the subject matter of Examples 14-19 includes, wherein the at least one display device is a stationary monitor.

In Example 21, the subject matter of Examples 14-20 includes, processing, by the computing platform, the motion-video observation to determine if any operator response to the package-handling prompting was made.

In Example 22, the subject matter of Examples 14-21 includes, processing, by the computing platform, the motion-video observation to determine a temporal indicator of time that each of the packages moving in the target area remains in the target area, and to vary a prominence of the package-handling prompting.

In Example 23, the subject matter of Examples 14-22 includes, processing, by the computing platform, the motion-video observation to determine if any operator response to the package-handling prompting was made, and to vary a prominence of the package-handling prompting based on the operator response determination.

In Example 24, the subject matter of Examples 14-23 includes, determining, by the computing platform, a call for corrective action for package handling of at least one of the packages in the target area, and to vary the package-handling prompting in response to the call for corrective action.

In Example 25, the subject matter of Examples 14-24 includes, determining, by the computing platform, a call for corrective action for package handling of at least one of the packages in the target area, and to generate a request for responsive package-handling prompting to be made at a downstream second target area.

In Example 26, the subject matter of Examples 14-25 includes, wherein the target area includes a package conveyance system on which the packages in the target area are moved, and further comprising: determining, by the computing platform, a call for corrective action for package handling of at least one of the packages in the target area, and to generate a request for responsive adjustment of motion of the package conveyance system.

Example 27 is at least one tangible machine-readable storage medium comprising instructions that, when executed by a processor-based system, cause the system to perform automated operations for package-handling informative support, the instructions causing the system to: receive motion-video observation of a target area in a package-handling facility, the motion-video observation to include, packages in the target area; generate display output to at least one display device that is configured to produce video images visible to a human operator proximate the target area process the motion-video observation to detect the packages in the target area and retrieve at least one package-specific routing-related attribute and at least one package-specific property for each of the packages; and generate the video output to include: a first portion representing the motion-video observation of the packages in the target area: and a second portion that includes a package-specific dynamic informational overlay corresponding to each of the packages in the target area, the dynamic informational overlay being visually associated with corresponding individual packages and including package-handling prompting for the operator based on the at least one package-specific routing-related attribute, and on the at least one package-specific property of each of the packages.

In Example 28, the subject matter of Example 27 includes, wherein the package-handling prompting for each of the packages is further based on a situational assessment of the corresponding packages based on the motion-video observation of the packages in the target area.

In Example 29, the subject matter of Examples 27-28 includes, wherein the instructions are to further cause the system to: track motion of the packages in the target area and to animate the package-specific dynamic informational overlay in response to the motion of the packages.

In Example 30, the subject matter of Examples 27-29 includes, wherein the instructions are to further cause the system to: analyze the motion-video observation of the packages in the target area to detect a package ID corresponding to each of the packages, and to use the detected package ID to retrieve the at least one package-specific routing-related attribute, and on the at least one package-specific property of each of the packages.

In Example 31, the subject matter of Examples 27-30 includes, wherein the instructions are to further cause the system to: receive a package ID corresponding to each of the packages, the package ID for each of the packages having been captured in or proximate to the target area.

In Example 32, the subject matter of Examples 27-31 includes, wherein the instructions are to further cause the system to: process the motion-video observation to determine if any operator response to the package-handling prompting was made.

In Example 33, the subject matter of Examples 27-32 includes, wherein the instructions are to further cause the system to: process the motion-video observation to determine a temporal indicator of time that each of the packages moving in the target area remains in the target area, and to vary a prominence of the package-handling prompting.

In Example 34, the subject matter of Examples 27-33 includes, wherein the instructions are to further cause the system to: process the motion-video observation to determine if any operator response to the package-handling prompting was made, and to vary a prominence of the package-handling prompting based on the operator response determination.

In Example 35, the subject matter of Examples 27-34 includes, wherein the instructions are to further cause the system to: determine a call for corrective action for package handling of at least one of the packages in the target area, and to vary the package-handling prompting in response to the call for corrective action.

In Example 36, the subject matter of Examples 27-35 includes, wherein the instructions are to further cause the system to: determine a call for corrective action for package handling of at least one of the packages in the target area, and to generate a request for responsive package-handling prompting to be made at a downstream second target area.

In Example 37, the subject matter of Examples 27-36 includes, wherein the target area includes a package conveyance system on which the packages in the target area are moved, and wherein the instructions are to further cause the system to determine a call for corrective action for package handling of at least one of the packages in the target area, and to generate a request for responsive adjustment of motion of the package conveyance system.

Example 38 is at least one machine-readable medium including instructions that, when executed by processing circuitry, cause the processing circuitry to perform operations to implement of any of Examples 1-37.

Example 39 is an apparatus comprising means to implement of any of Examples 1-37.

Example 40 is a system to implement of any of Examples 1-37.

Example 41 is a method to implement of any of Examples 1-37.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A package-handling support apparatus, comprising:
a video-camera interface to receive motion-video observation of a target area in a package-handling facility, the motion-video observation to include packages in the target area;
a display interface to provide display output to at least one display device that is configured to produce video images visible to a human operator proximate the target area; and
a controller operatively coupled to the video-camera interface and to the display interface, and configured to:
process the motion-video observation to detect the packages in the target area and retrieve at least one package-specific routing-related attribute and at least one package-specific property for each of the packages;
generate the video output to include:
a first portion representing the motion-video observation of the packages in the target area; and
a second portion that includes a package-specific dynamic informational overlay corresponding to each of the packages in the target area, the dynamic informational overlay being visually associated with corresponding individual packages and including package-handling prompting for the operator based on the at least one package-specific routing-related attribute, and on the at least one package-specific property of each of the packages.

2. The apparatus of claim 1, wherein the package-handling prompting for each of the packages is further based on a situational assessment of the corresponding packages based on the motion-video observation of the packages in the target area.

3. The apparatus of claim 1, wherein the controller is further configured to track motion of the packages in the target area and to animate the package-specific dynamic informational overlay in response to the motion of the packages.

4. The apparatus of claim 1, wherein the controller is to process the motion-video observation to determine if any operator response to the package-handling prompting was made.

5. The apparatus of claim 1, wherein the controller is to process the motion-video observation to determine if any operator response to the package-handling prompting was made, and to vary a prominence of the package-handling prompting based on the operator response determination.

6. The apparatus of claim 1, wherein the controller is to determine a call for corrective action for package handling of at least one of the packages in the target area, and to vary the package-handling prompting in response to the call for corrective action.

7. The apparatus of claim 1, wherein the controller is to determine a call for corrective action for package handling of at least one of the packages in the target area, and to generate a request for responsive package-handling prompting to be made at a downstream second target area.

8. The apparatus of claim 1, wherein the target area includes a package conveyance system on which the packages in the target area are moved, and wherein the controller is to determine a call for corrective action for package handling of at least one of the packages in the target area, and to generate a request for responsive adjustment of motion of the package conveyance system.

9. An automated method for package-handling informative support, the method comprising:
receiving, by a computing platform, motion-video observation of a target area in a package-handling facility, the motion-video observation to include packages in the target area;
generating display output, by the computing platform, to at least one display device that is configured to produce video images visible to a human operator proximate the target area;
processing, by the computing platform, the motion-video observation to detect the packages in the target area and retrieve at least one package-specific routing-related attribute and at least one package-specific property for each of the packages;
generating, by the computing platform, the video output to include:
a first portion representing the motion-video observation of the packages in the target area; and
a second portion that includes a package-specific dynamic informational overlay corresponding to each of the packages in the target area, the dynamic informational overlay being visually associated with corresponding individual packages and including package-handling prompting for the operator based on the at least one package-specific routing-related attribute, and on the at least one package-specific property of each of the packages.

10. The method of claim 9, wherein the package-handling prompting for each of the packages is further based on a situational assessment of the corresponding packages based on the motion-video observation of the packages in the target area.

11. The method of claim 9, further comprising:
tracking motion of the packages, by the computing platform, in the target area and to animate the package-specific dynamic informational overlay in response to the motion of the packages.

12. The method of claim 9, further comprising:
analyzing, by the computing platform, the motion-video observation of the packages in the target area to detect a package ID corresponding to each of the packages, and to use the detected package ID to retrieve the at least one package-specific routing-related attribute, and on the at least one package-specific property of each of the packages.

13. The method of claim 9, further comprising:
receiving, by the computing platform, a package ID corresponding to each of the packages, the package ID for each of the packages having been captured in or proximate to the target area.

14. At least one tangible machine-readable storage medium comprising instructions that, when executed by a processor-based system, cause the system to perform automated operations for package-handling informative support, the instructions causing the system to:

receive motion-video observation of a target area in a package-handling facility, the motion-video observation to include packages in the target area;

generate display output to at least one display device that is configured to produce video images visible to a human operator proximate the target area process the motion-video observation to detect the packages in the target area and retrieve at least one package-specific routing-related attribute and at least one package-specific property for each of the packages, and generate the video output to include:

a first portion representing the motion-video observation of the packages in the target area; and a second portion that includes a package-specific dynamic informational overlay corresponding to each of the packages in the target area, the dynamic informational overlay being visually associated with corresponding individual packages and including package-handling prompting for the operator based on the at least one package-specific routing-related attribute, and on the at least one package-specific property of each of the packages.

15. The at least one machine-readable storage medium of claim 14, wherein the instructions are to further cause the system to:

process the motion-video observation to determine if any operator response to the package-handling prompting was made.

16. The at least one machine-readable storage medium of claim 14, wherein the instructions are to further cause the system to:

process the motion-video observation to determine a temporal indicator of time that each of the packages moving in the target area remains in the target area, and to vary a prominence of the package-handling prompting.

17. The at least one machine-readable storage medium of claim 14, wherein the instructions are to further cause the system to:

process the motion-video observation to determine if any operator response to the package-handling prompting was made, and to vary a prominence of the package-handling prompting based on the operator response determination.

18. The at least one machine-readable storage medium of claim 14, wherein the instructions are to further cause the system to:

determine a call for corrective action for package handling of at least one of the packages in the target area, and to vary the package-handling prompting in response to the call for corrective action.

19. The at least one machine-readable storage medium of claim 14, wherein the instructions are to further cause the system to:

determine a call for corrective action for package handling of at least one of the packages in the target area, and to generate a request for responsive package-handling prompting to be made at a downstream second target area.

20. The at least one machine-readable storage medium of claim 14, wherein the target area includes a package conveyance system on which the packages in the target area are moved, and wherein the instructions are to further cause the system to determine a call for corrective action for package handling of at least one of the packages in the target area, and to generate a request for responsive adjustment of motion of the package conveyance system.

* * * * *